United States Patent [19]

Barske

[11] Patent Number: 4,593,558

[45] Date of Patent: Jun. 10, 1986

[54] METHOD OF OPTIMIZING THE AERODYNAMICS OF A VEHICLE BODY

[75] Inventor: Heiko Barske, Ingolstadt, Fed. Rep. of Germany

[73] Assignee: Audi AG, Ingolstadt, Fed. Rep. of Germany

[21] Appl. No.: 704,582

[22] Filed: Feb. 22, 1985

[30] Foreign Application Priority Data

Feb. 24, 1984 [DE] Fed. Rep. of Germany ....... 3406718

[51] Int. Cl.$^4$ .............................................. G01M 9/00
[52] U.S. Cl. ......................................... 73/147; 296/15
[58] Field of Search ............................. 73/147; 296/15

[56] References Cited

U.S. PATENT DOCUMENTS 3,893,335  7/1975  Johnson et al. ....................... 73/147

FOREIGN PATENT DOCUMENTS 0044828  4/1981  Japan .................................... 73/147
0035435  3/1983  Japan .................................... 73/147

Primary Examiner—Donald O. Woodiel
Attorney, Agent, or Firm—Lalos, Keegan & Kaye

[57] ABSTRACT

A method of optimizing the aerodynamic characteristics of a vehicle body comprising positioning a vehicle body provided with desired configurations and dispositions of interior compartments and components in a wind tunnel facility, depositing fluid entrainable particles on the vehicle body and operating the wind tunnel facility to direct a fluid stream onto the vehicle body laden with such entrainable particles whereby the particles are caused to be entrained by the fluid stream along laminar layers of fluid flow and remain deposited in various stagnant, barrier and wake zones, resulting in a reconfigured vehicle body having optimized aerodynamic characteristics. The particles can be deposited on the vehicle body and the fluid stream may then be directed onto the vehicle body or the particles may be injected into the fluid stream upstream of the vehicle body to be entrained and carried by the fluid stream and deposited on the vehicle body in the stagnation, barrier and wake zones.

24 Claims, 4 Drawing Figures

METHOD OF OPTIMIZING THE AERODYNAMICS OF A VEHICLE BODY

This invention relates to a method of designing the configuration of vehicles including land vehicles, aircraft and watercraft, and more particularly to a method of optimizing the aerodynamic characteristics such vehicles consistent with meeting the functional requirements of the vehicles.

In the design of vehicles such as passenger automobiles, it has been the conventional practice in the automotive industry to package the various functional compartments and components of a vehicle such as the passenger compartment, the engine compartment, the trunk compartment, the engine, transmission, and the like, and then to position such a vehicle body in a wind tunnel facility to empirically devise an outer body configuration or envelope providing optimal aerodynamic characteristics. Typically, after the interior compartments and components have been located and positioned in the vehicle body and tested in a wind tunnel facility, the test results are analyzed and the outer configuration of the vehicle body is modified repeatedly until an acceptable compromise is reached between the interior compartment and component requirements and the aerodynamic characteristics of the vehicle. Often, it is necessary to make a number of modifications before a suitable body configuration is derived. Such an iteration process, however, is both time-consuming and costly, making it desirable to provide an improved method of arriving at an exterior configuration of a vehicle body having optimal aerodynamic characteristics.

Accordingly, it is the principal object of the present invention to provide an improved method of designing a vehicle body.

Another object of the present invention is to provide an improved method of designing the outer configuration of a vehicle body such as a land vehicle, an aircraft or a water-craft.

A further object of the present invention is to provide an improved method of designing the outer configuration of a vehicle body, having optimal aerodynamic characteristics.

A still further object of the present invention is to provide an improved method of devising the exterior configuration of a vehicle body having optimal aerodynamic characteristics consistent with the functional requirements of the vehicle such as the configuration and disposition of the interior compartments and components of the vehicle.

Another object of the present invention is to provide a novel method of designing the exterior configuration or envelope of a vehicle body having optimal aerodynamic characteristics consistent with the configuration and disposition requirements of the interior compartments and components of the vehicle which eliminates the requirement of the conventional iterative process of testing the vehicle body in a wind tunnel facility, and modifying the exterior configuration of the vehicle body on the basis of testing results.

A further object of the present invention is to provide an improved method of designing the exterior configuration of a vehicle body to provide optimal aerodynamic characteristics which is less time-consuming and costly than conventional methods presently employed in the prior art.

Other objects and advantages of the present invention will become more apparent to those persons having ordinary skill in the art to which the present invention pertains from the following description taken in conjunction with the accompanying drawings wherein.

Figure 2A:
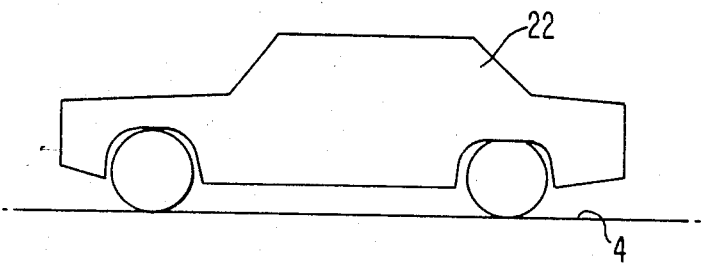
FIG. 2a is a side elevational view of a vehicle in which the interior compartments and components have been arranged and for which the exterior configuration is to be devised.
Figure 2B:
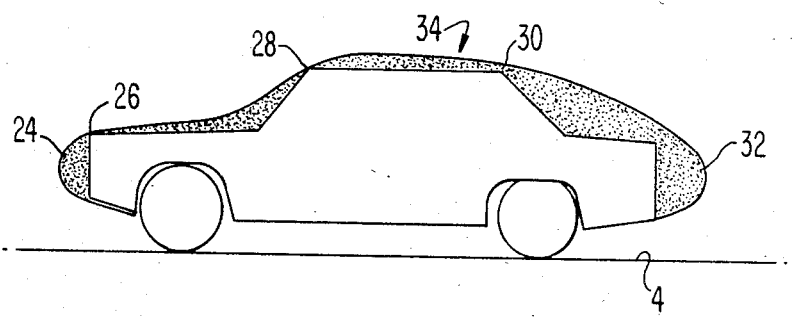
Figure 2C:
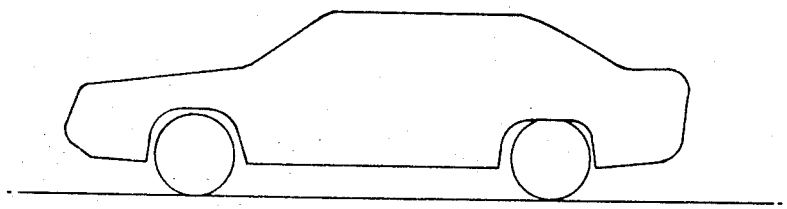

FIG. 2b is a side elevational view of the vehicle shown in FIG. 2a in which the exterior configuration of the body has been converted in accordance with the method of the present invention to provide a configuration having optimal aerodynamic characteristics; and FIG. 2c is a side elevational view of the vehicle shown in FIG. 2b having the exterior configuration modified further to comply with various regulatory requirements.

Generally, the method of the present invention consists of devising a vehicle body having an exterior configuration accommodating the configurations and dispositions of the interior compartments and components of the vehicle, positioning such vehicle body in a wind tunnel facility, depositing fluid entrainable particles on the exterior of the vehicle body and then operating the wind tunnel facility to direct a fluid stream onto the particle laden vehicle body to entrain and carry off particles disposed in regions of laminar fluid flow about the vehicle body and allow undisturbed particles deposited in stagnation, barrier or wake zones on the exterior of the vehicle body, thus providing a resultant exterior body configuration having optimal aerodynamic characteristics. The particles may be deposited on the exterior surfaces of the vehicle body prior to operating the wind tunnel facility and directing a fluid stream onto the particle laden vehicle body or the particles may be injected into the fluid stream upstream of the vehicle body. The exterior surfaces of the vehicle body may be coated with an adhesive substance to facilitate the adhesion of the particles, the particles may be formed of adhesive substances or both the exterior surfaces of the vehicle body may be coated with an adhesive substance and the particles may be formed of adhesive materials. Furthermore, in the embodiment in which the particles are injected into the airstream upstream of the vehicle body, an adhesive substance may be injected into the fluid stream upstream of the injection of the particles into the fluid stream so that the particles will be coated with an adhesive substance prior to being brought into contact with the exterior surfaces of the vehicle body.

Figure 1:
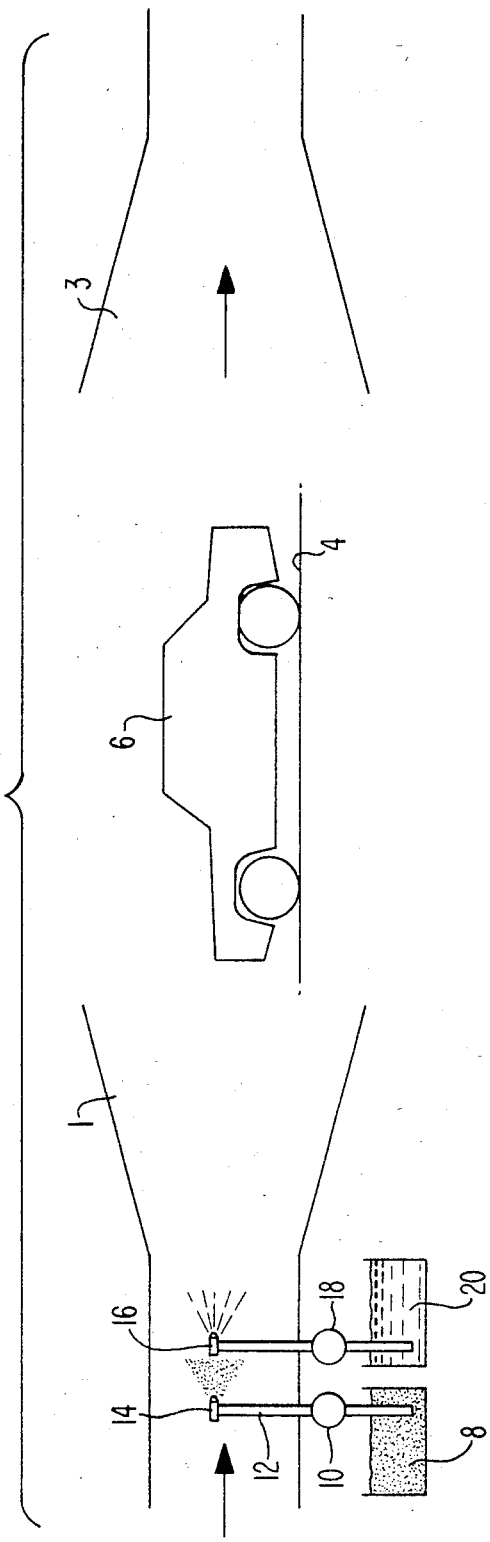
FIG. 1 is a schematic-diagrammatic view of a wind tunnel arrangement which may be utilized to practice the present invention.

Referring to FIG. 1 of the drawings, there is illustrated a wind tunnel facility which may be utilized to practice the method of the present invention which includes an inlet section 1, an outlet section 3 and a support platform 4 between the inlet and outlet sections for supporting a vehicle body 6 having an exterior configuration accommodating the pre-packaged interior compartments and components of the vehicle. Upstream of the outlet section there is provided a particle storage tank 8 from which particles are withdrawn by a pump 10 and ejected through a conduit 12 and a nozzle 14 into an airstream flowing from the outlet section, past the vehicle body positioned on the support platform and into the outlet section. Disposed downstream of the particle injecting device is a storage tank 20 containing an adhesive liquid which is drawn by a pump 18 and ejected through a nozzle 16 into the airstream laden with entrained particles. The dispersion of the adhesive liquid into the airstream causes the entrained particles to be coated with the adhesive substance and thus renders them more readily attachable to the vehicle body downstream.

As the airstream laden with adhesive particles contacts the vehicle body positioned on support platform 4, the turbulence of the airstream in the stagnation, barrier and wake zones of the vehicle such as the zones forwardly of the hood portion 26, forwardly of the windshield area 28, and rearwardly of the rear window area 30 and the tail end of the vehicle, will cause a build-up or accumulation of particles adhering to the vehicle surfaces in such zones and to each other to reconfigure the vehicle in sections such as 24 and 32 to provide a resultant exterior configuration 34 having optimal aerodynamic characteristics. The entrained particles carried in laminar flow areas of the airstream will be swept past the vehicle surfaces and the zones of build-up particles, and be withdrawn through the outlet section of the wind tunnel facility. Such undeposited articles may be filtered from the airstream and reconditioned and recycled if desired.

Although the exterior configuration of the vehicle after the use of the method as described may provide an exterior configuration having optimal aerodynamic characteristics, such configuration may not be acceptable in that it may not conform with certain regulatory requirements. Accordingly, the exterior configuration of the vehicle body may have to be modified further to conform to such regulatory requirements which perhaps would result in a vehicle body having a final exterior configuration as shown in FIG. 2c. This can be readily accomplished by applying a resin solution to cause the deposited particle to harden and then shaping the configuration 34 further to make the vehicle conform with respect to certain regulatory requirements such as front and rear vision clearance and ground clearance.

As previously stated, the adhesion of the particles to the exterior surfaces of the vehicle body can be facilitated by forming the vehicle body of an adhesive substance or coating selected exterior surfaces of the vehicle body with adhesive substances. The particles may be deposited on the vehicle body prior to operating the wind tunnel facility or may be injected into the airstream as previously described. The particles may be formed of any suitable materials which may be entrained in a fluid stream and deposited in the stagnation, barrier and wake zones of the vehicle body, such as silicic acid particles, Styropor particles, sawdust particles and the like. In addition, any suitable aqueous adhesive may be utilized to coat the particles, such as an aqueous sugar solution. Under suitable temperature conditions, where air is used in the fluid stream, snowflakes may be used as the particles injected into the fluid stream, which readily adhere to the vehicle body surfaces and to each other.

The present invention is predicated on several phenomena, the propensity of particles entrained in the airstream to settle in barrier zones of a body situated in the airstream, the propensity of particles entrained in the airstream to settle in wake zones of such a body and the increased entrainment of particles settled on the body upon increasing the velocity of the fluid stream. The combined effects of such phenomena results in a vehicle body having optimum aerodynamic characteristics.

Several parameters including the density of the particles, the velocity of the airstream, the adhesive properties of the particles and/or the surfaces of the vehicle body must be correlated to provide the desired effects of the method. To provide for the deposit of particles in stagnation zones, particles having a density greater than the density of the fluid medium would be used. On the other hand, in zones such as barrier and wake zones where particles are to be deposited in greater volume, particles having densities only slightly greater than the density of the fluid medium are used so as to provide turbulence in such zones, and correspondingly, the adherence of the particles to the vehicle body and to each other. It further is contemplated within the scope of the present invention that particles of different materials and densities, having adhesive or non-adhesive properties, may be utilized by injecting such particles into the fluid stream either simultaneously or successively.

The present invention further contemplates the optimization of the aerodynamics of land vehicles, aircraft and watercraft utilizing laminar flow of gaseous or liquid media having compatible particles entrained therein.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. The method of optimizing the aerodynamic characteristics of a body comprising:
   depositing fluid entrainable particles on said body and
   directing a fluid stream of laminar flow onto said body
   whereby certain portions of said particles are caused to be displaced in boundary layers of laminar flow of said fluid stream and certain portions of said particles are caused to remain deposited in certain zones adjacent said body, producing a resultant configuration of said body having optimal aerodynamic characteristics.

2. A method according to claim 1, wherein said particles are deposited on said body prior to directing said fluid stream onto said body.

3. A method according to claim 2, wherein the velocity of the fluid stream is increased gradually until particles disposed in laminar flow regions of the airstream are caused to be removed by said airstream.

4. A method according to claim 1, wherein said particles are injected into and become entrained in said fluid stream upstream relative to said body.

5. A method according to any one of claims 1 through 4 in which at least selective surfaces of the body are formed of a non-adhering material.

6. A method according to any one of claims 1 through 4 in which at least selected surfaces of said body are formed of a particle adhering material.

7. A method according to any one of claims 1 through 4 in which the particles are formed of at least one material which will cause the particles to adhere to each other.

8. A method according to any one of claims 1 through 4 in which the particles are formed of at least one material which will cause the particles to adhere to at least selected portions of said body.

9. A method according to any one of claims 1 through 4 in which the particles are formed of at least one material which will cause the particles to adhere to each other and to at least selected surfaces of said body.

10. A method according to any one of claims 1 through 4 in which the fluid stream directed onto said body comprises an airstream.

11. A method according to claim 4, wherein said fluid stream consists of an airstream and said particles comprise highly dispersed particles of silicic acid.

12. A method according to claim 11 in which at least selected surfaces of said body are formed of a non-adhering material.

13. A method according to claim 11 in which at least selected surfaces of said body are formed of a particle adhering material.

14. A method according to claim 4 in which a fluid which imparts adhesive properties to said particles is injected into said fluid stream to coat said particles.

15. A method according to claim 14 in which at least selected surfaces of said body are formed of a non-adhering material.

16. A method according to claim 14 in which at least selected surfaces of said body are formed of particle adhering materials.

17. A method according to any one of claims 14 through 16 in which the fluid injected into the airstream to coat said particles comprises an aqueous sugar solution.

18. A method according to any one of claims 1 through 4 in which said particles entrained in said fluid stream and carried downstream of said body are recovered for recycling.

19. A method according to any one of claims 1 through 4 in which said body comprises a land vehicle.

20. A method according to any one of claims 1 through 4 in which said body comprises a watercraft.

21. A method according to any one of claims 1 through 4 in which said body comprises an aircraft.

22. A method according to claim 4 in which particles of different compositions are injected into said fluid stream.

23. A method according to claim 4 in which particles of different compositions are injected into said fluid stream successively.

24. A method according to claim 4 in which the particles injected into said airstream have densities greater than the density of the fluid medium.

* * * * *